US012645246B2

(12) United States Patent
Kusaka et al.

(10) Patent No.: US 12,645,246 B2
(45) Date of Patent: Jun. 2, 2026

(54) OPTICAL DIFFRACTION ELEMENT, OPTICAL COMPUTING DEVICE, METHOD FOR ADJUSTING POSITION OF OPTICAL DIFFRACTION ELEMENT, AND METHOD FOR MANUFACTURING OPTICAL COMPUTING DEVICE

(71) Applicant: FUJIKURA LTD., Tokyo (JP)

(72) Inventors: Hiroyuki Kusaka, Tokyo (JP); Masahiro Kashiwagi, Tokyo (JP)

(73) Assignee: FUJIKURA LTD., Tokyo (JP)

( * ) Notice: Subject to any disclaimer, the term of this patent is extended or adjusted under 35 U.S.C. 154(b) by 334 days.

(21) Appl. No.: 18/263,201

(22) PCT Filed: Nov. 9, 2021

(86) PCT No.: PCT/JP2021/041095
§ 371 (c)(1),
(2) Date: Jul. 27, 2023

(87) PCT Pub. No.: WO2022/176282
PCT Pub. Date: Aug. 25, 2022

(65) Prior Publication Data
US 2024/0118724 A1    Apr. 11, 2024

(30) Foreign Application Priority Data
Feb. 18, 2021    (JP) ................................. 2021-024499

(51) Int. Cl.
*G06E 1/00*        (2006.01)
*G02B 5/18*        (2006.01)

(52) U.S. Cl.
CPC ............. *G06E 1/00* (2013.01); *G02B 5/1847* (2013.01)

(58) Field of Classification Search
None
See application file for complete search history.

(56) References Cited

U.S. PATENT DOCUMENTS

| | | | | |
|---|---|---|---|---|
| 5,521,733 A | * | 5/1996 | Akiyama | ........... G02B 6/29362 |
| | | | | 398/48 |
| 7,847,225 B2 | * | 12/2010 | Yokoyama | ............. G06N 3/067 |
| | | | | 382/156 |
| 2010/0194854 A1 | | 8/2010 | Kroll et al. | |
| 2015/0260994 A1 | | 9/2015 | Akutsu et al. | |
| 2018/0191953 A1 | | 7/2018 | Stork et al. | |

(Continued)

FOREIGN PATENT DOCUMENTS

| | | |
|---|---|---|
| CN | 110658573 A | 1/2020 |
| CN | 111095128 A | 5/2020 |

(Continued)

OTHER PUBLICATIONS

International Search Report issued in corresponding International Application No. PCT/JP2021/041095 mailed Feb. 1, 2022 (2 pages).

(Continued)

*Primary Examiner* — Robert E. Tallman
(74) *Attorney, Agent, or Firm* — Osha Bergman Watanabe & Burton LLP

(57) ABSTRACT
A light diffraction element includes a computing optical structure constituted by microcells, and a position adjustment optical structure outside the computing optical structure.

9 Claims, 2 Drawing Sheets

(56) References Cited

U.S. PATENT DOCUMENTS

| | | | | |
|---|---|---|---|---|
| 2020/0242463 A1* | 7/2020 | Lee | ..................... | G02B 5/1809 |
| 2022/0269100 A1* | 8/2022 | Kusaka | ............. | G02B 27/4261 |

FOREIGN PATENT DOCUMENTS

| | | |
|---|---|---|
| JP | H04-324406 A | 11/1992 |
| JP | H06-244085 A | 9/1994 |
| JP | H09-68705 A | 3/1997 |
| JP | 2005-91891 A | 4/2005 |
| JP | 2005-131882 A | 5/2005 |
| JP | 2005-308643 A | 11/2005 |
| JP | 2009-134232 A | 6/2009 |
| WO | 2019/147828 A1 | 8/2019 |
| WO | 2019200289 A1 | 10/2019 |

OTHER PUBLICATIONS

Written Opinion issued in corresponding International Application No. PCT/JP2021/041095 mailed Feb. 1, 2022 (8 pages).
International Search Report issued in corresponding International Application No. PCT/JP2021/045042 mailed Feb. 8, 2022 (2 pages).
Written Opinion issued in corresponding International Application No. PCT/JP2021/045042 mailed Feb. 8, 2022 (6 pages).
Luo, Yi et al., "Design of task-specific optical systems using broadband diffractive neural networks," Light: Science & Applications, vol. 8, article 112, pp. 1-14 (2019). DOI: 10.1038/s41377-019-0223-1. (14 pages)

* cited by examiner

OPTICAL DIFFRACTION ELEMENT, OPTICAL COMPUTING DEVICE, METHOD FOR ADJUSTING POSITION OF OPTICAL DIFFRACTION ELEMENT, AND METHOD FOR MANUFACTURING OPTICAL COMPUTING DEVICE

BACKGROUND

Technical Field

The present invention relates to a light diffraction element having an optical computing function. Further, the present invention relates to an optical computing device including such a light diffraction element. Furthermore, the present invention relates to a method for adjusting a position of such a light diffraction element. Furthermore, the present invention relates to a method for manufacturing such an optical computing device.

Description of the Related Art

Known is a light diffraction element that includes a plurality of microcells each of which has an individually set thickness and that optically performs predetermined computing by causing mutual interference of light beams which have passed through the respective microcells. Optical computing performed with use of a light diffraction element has an advantage of achieving higher speed and lower electric power consumption as compared with electrical computing performed with use of a processor. Patent Literature 1 discloses an optical neural network which has an input layer, an intermediate layer and an output layer. The light diffraction element described above can be used as, for example, an intermediate layer of such an optical neural network.

PATENT LITERATURE

Patent Literature 1: U.S. Pat. No. 7,847,225

In order to perform advanced optical computing, a plurality of light diffraction elements used are aligned such that light outputted from an n-th light diffraction element is inputted to an n+1-th light diffraction element. In this case, inaccurate adjustment of a position of the n+1-th light diffraction element with respect to the n-th light diffraction element makes it impossible to perform predetermined optical computing. Thus, highly accurate adjustment of a position of the n+1 light diffraction element with respect to the n-th light diffraction element is required in order to achieve an optical computing device that performs advanced optical computing.

SUMMARY

One or more embodiments provide a light diffraction element which allows for accurate adjustment of a position of the light diffraction element with respect to another light diffraction element that is disposed so as to precede or follow the light diffraction element. In addition, one or more embodiments provide: an optical computing device including such a light diffraction element; a method for adjusting a position of such a light diffraction element; and a method for manufacturing such an optical computing device.

A light diffraction element in accordance with one or more embodiments employs a configuration such that the light diffraction element includes: a computing optical structure constituted by a plurality of microcells; and a position adjustment optical structure formed outside the computing optical structure.

One or more embodiments make it possible to provide a light diffraction element that allows for accurate adjustment of a position of the light diffraction element with respect to another light diffraction element that is disposed so as to precede or follow the light diffraction element. In addition, one or more embodiments make it possible to provide: an optical computing device including such a light diffraction element; a method for adjusting a position of such a light diffraction element; and a method for manufacturing such an optical computing device.

DESCRIPTION OF THE EMBODIMENTS

Configuration of Light Diffraction Element

Figure 1:
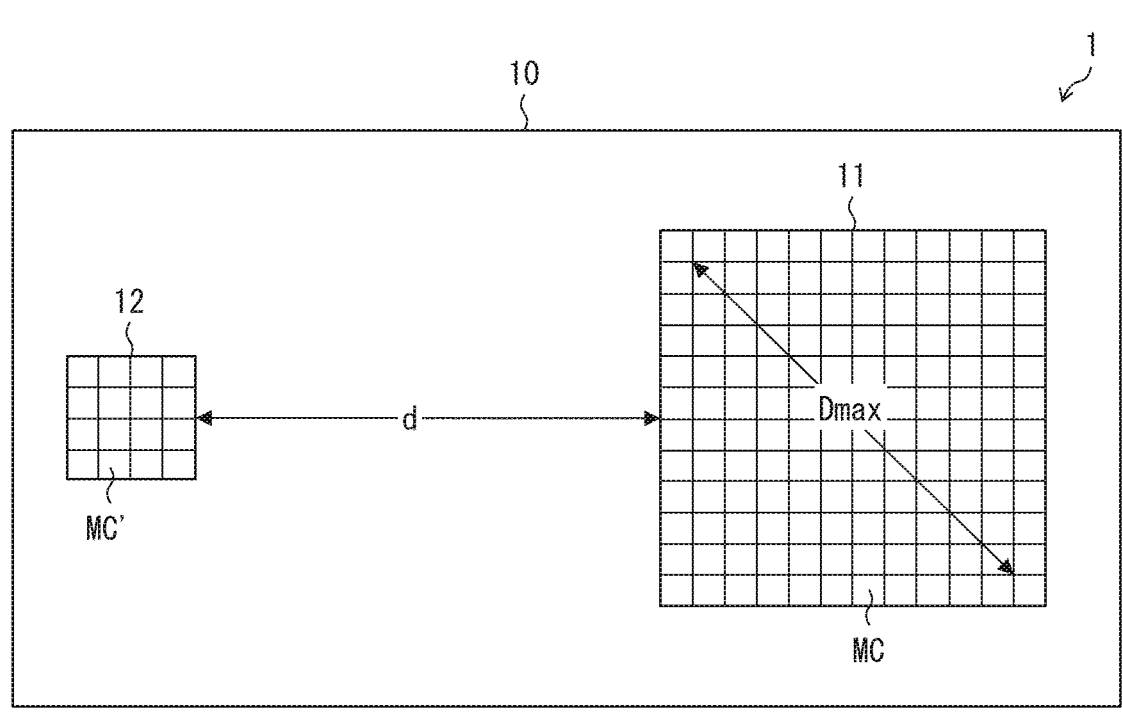
FIG. 1 is a plan view illustrating a configuration of a light diffraction element in accordance with one or more embodiments.

With reference to FIG. 1, the following will describe a configuration of a light diffraction element 1 in accordance with one or more embodiments. FIG. 1 is a plan view illustrating a configuration of the light diffraction element 1.

The light diffraction element 1 is a light-transmissive plate-like member and, as illustrated in FIG. 1, includes: a substrate 10; a computing optical structure 11 formed on a first main surface of the substrate 10; and a position adjustment optical structure 12 formed on a first main surface or second main surface (that is a main surface located on an opposite side to the first main surface) of the substrate 10. Each of the substrate 10, the computing optical structure 11, and the position adjustment optical structure 12 may be made of, for example, glass (for example, quartz glass) or may be made of resin (for example, photo-curable resin).

The position adjustment optical structure 12 is formed outside the computing optical structure 11. Here, the expression "the position adjustment optical structure 12 is formed outside the computing optical structure 11" means, for example, the following. That is, in a case where the position adjustment optical structure 12 is formed on the first main surface of the substrate 10, no portion is shared by: an area in which the computing optical structure 11 is formed on the first main surface; and an area in which the position adjustment optical structure 12 is formed on the first main surface. In addition, in a case where the position adjustment optical structure 12 is formed on the second main surface of the substrate 10, no portion is shared by: an area in which the computing optical structure 11 is formed on the first main surface; and an orthogonal projection obtained on the first main surface by an area in which the position adjustment optical structure 12 is formed on the second main surface.

The computing optical structure 11 is an optical structure configured to perform predetermined optical computing. The computing optical structure 11 can be constituted by, for example, a plurality of microcells MC that have respective thicknesses or refractive indices which are set independently of each other. When signal light is inputted to the computing optical structure 11, signal light beams that have been diffracted by the respective microcells MC interfere with each other, so that predetermined optical computing is performed. An intensity distribution of the signal light outputted from the computing optical structure 11 shows a result of the optical computing.

Here, the term "microcell" means, for example, a cell having a cell size of less than 10 μm. The term "cell size" refers to a square root of an area of a cell. For example, in a case where a microcell has a square shape in a plan view, the cell size is a length of one side of the cell. The cell size has a lower limit that is not particularly limited but may be, for example, 1 nm.

The computing optical structure 11 illustrated in FIG. 1 is constituted by 12×12 microcells MC that are arranged in a matrix manner. The shape of each of the microcells MC in plan view is, for example, a square with a size of 1 μm×1 μm, and the shape of the computing optical structure 11 in plan view is, for example, a square with a size of 12 μm×12 μm.

Figure 2:
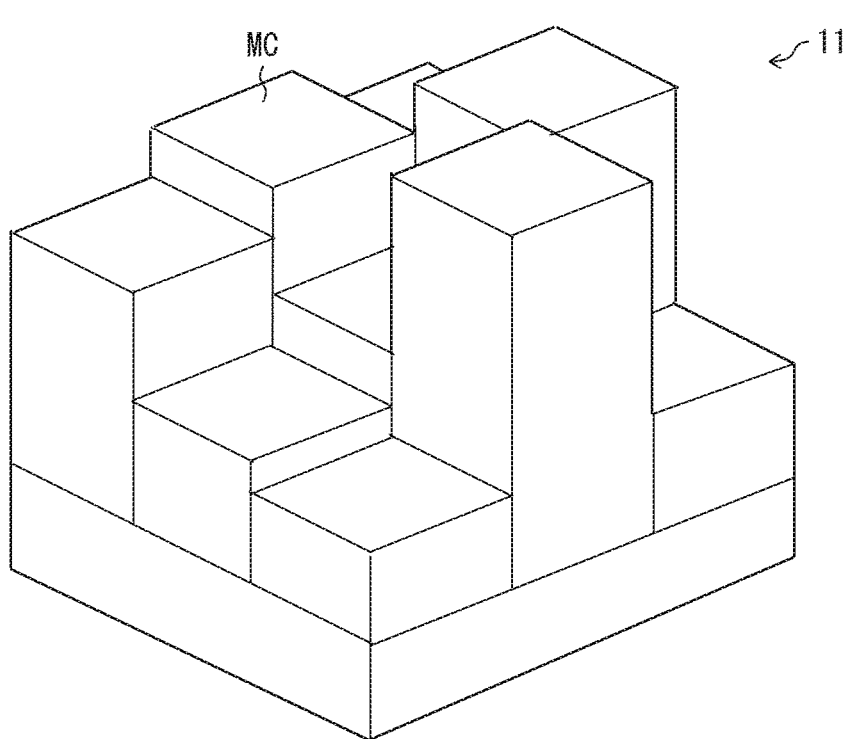
FIG. 2 is a perspective view illustrating an enlarged portion of a computing optical structure that is included in the light diffraction element illustrated in FIG. 1.

The light beams that pass through the respective microcells MC can have phase-shift amounts that are set independently of each other by (i) setting the thicknesses of the respective microcells MC independently of each other or (ii) selecting the refractive indices of the respective microcells MC independently of each other. One or more embodiments employ the method (i), which can be performed by nano-imprinting. In this case, as illustrated in FIG. 2, each of the microcells MC is constituted by a pillar that has a quadrangular prism shape and that has a square bottom surface which has sides each having a length equal to the cell size. In this case, a phase-shift amount of light that passes through a microcell MC is determined in accordance with a height of the pillar. That is, the light that passes through the microcell MC constituted by a high pillar has a large phase-shift amount, and the light that passes through the microcell MC constituted by a low pillar has a small phase-shift amount.

Note that the thickness or the refractive index of each of the microcells MC can be set, for example, through machine learning. A model used in this machine learning can be, for example, a model to which the intensity distribution of the signal light inputted to the computing optical structure 11 is inputted and from which the intensity distribution of the signal light outputted from the computing optical structure 11 is outputted and which includes, as a parameter, the thickness or the refractive index of each of the microcells MC. Here, the intensity distribution of the signal light inputted to the computing optical structure 11 means, for example, a set of numerical values indicative of intensities of signal light beams which are inputted to the respective microcells MC constituting the computing optical structure 11. In addition, the intensity distribution of the signal light outputted from the computing optical structure 11 means, for example, a set of numerical values indicative of intensities of signal light beams which are inputted to respective microcells constituting a computing optical structure of another light diffraction element that is disposed so as to follow the light diffraction element 1 or a set of numerical values indicative of intensities of signal light beams which are inputted to respective cells of a light receiving device (for example, a two-dimensional image sensor) that is disposed so as to follow the light diffraction element 1.

The position adjustment optical structure 12 is an optical structure for adjusting a position of the light diffraction element 1 with respect to another light diffraction element that is disposed so as to precede or follow the light diffraction element 1. The position adjustment optical structure 12 can be constituted by, for example, a plurality of microcells MC' each of which has a thickness, refractive index, or transmittance that is independently set.

For example, the position adjustment optical structure 12 may be used to form an optical image having a specific intensity distribution on a position adjustment optical structure of another light diffraction element that is disposed so as to follow the light diffraction element 1. Such a position adjustment optical structure 12 can be achieved, for example, by setting thicknesses of the respective microcells MC' so that the position adjustment optical structure 12 has a function equivalent to that of a condenser lens having a specific shape.

Alternatively, the position adjustment optical structure 12 may be used to change an intensity distribution of an optical image which has been formed by a position adjustment optical structure of another light diffraction element that is disposed so as to precede the light diffraction element 1. This change is made in accordance with a position of the light diffraction element 1 with respect to the another light diffraction element. Such a position adjustment optical structure 12 can be achieved, for example, by setting transmittances of the respective microcells MC' so that the position adjustment optical structure 12 has a function equivalent to that of a mask having a specific shape.

Further, the position adjustment optical structure 12 is preferably positioned sufficiently apart from the computing optical structure 11 in order to sufficiently reduce influence of the position adjustment optical structure 12 on the signal light. For example, when a distance d between the computing optical structure 11 and the position adjustment optical structure 12 is set to be larger than a maximum value D max of a distance between two microcells that are selected from the plurality of microcells constituting the computing optical structure 11, the influence of the position adjustment optical structure 12 on the signal light can be reduced to a negligible level.

Here, the distance d between the computing optical structure 11 and the position adjustment optical structure 12 means, for example, a minimum value of a distance d(P, Q) between a point P on the computing optical structure 11 and a point Q on the position adjustment optical structure 12. That is, $d=\min^{P,Q} d(P, Q)$.

Configuration of Optical Computing Device

Figure 3:
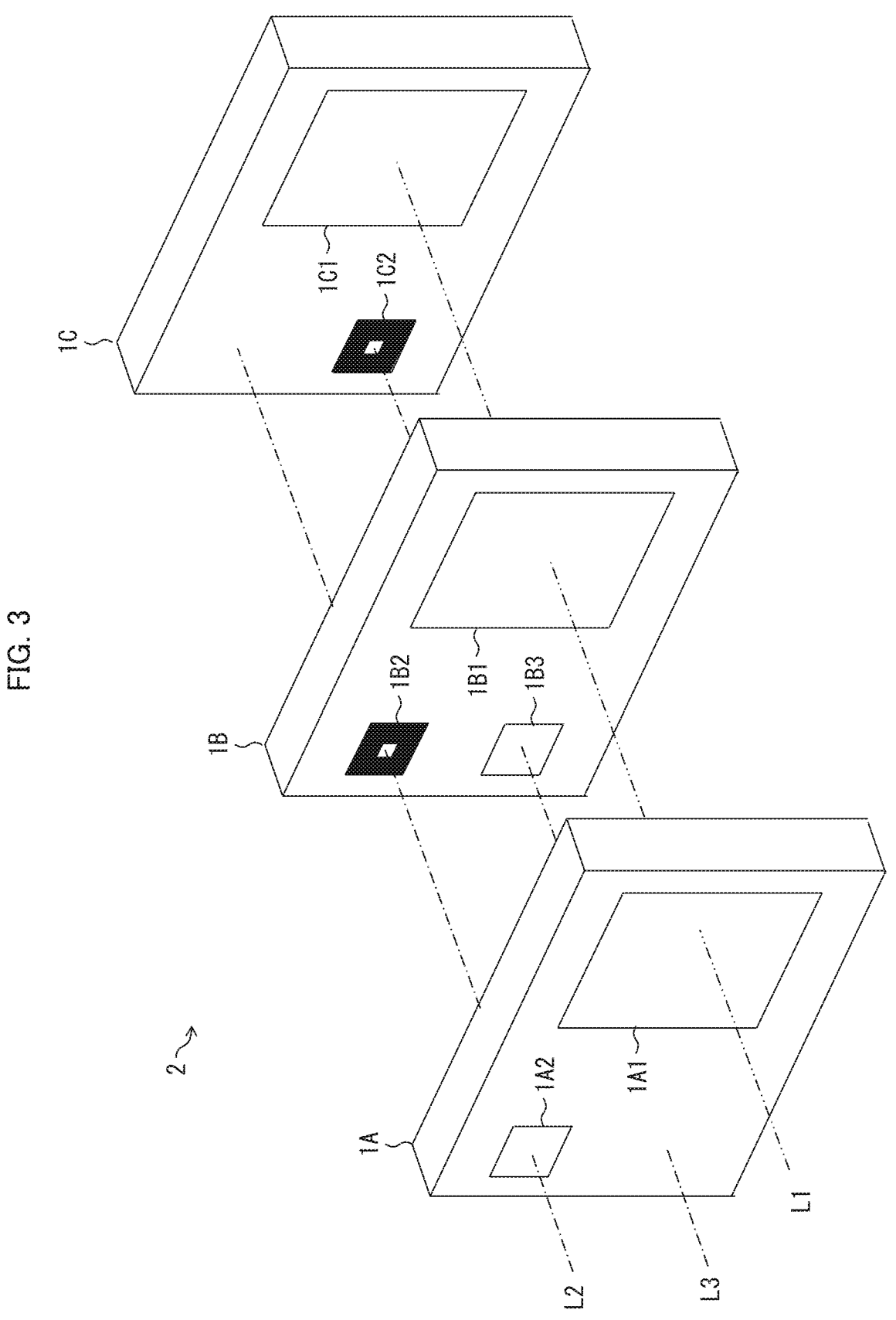
FIG. 3 is a perspective view illustrating a configuration of an optical computing device in accordance with one or more embodiments.

With reference to FIG. 3, the following will describe a configuration of an optical computing device 2 in accordance with one or more embodiments. FIG. 3 is a perspective view illustrating a configuration of the optical computing device 2.

As illustrated in FIG. 3, the optical computing device 2 includes: a first light diffraction element 1A; a second light diffraction element 1B that is disposed so as to follow the first light diffraction element 1A; and a third light diffraction element 1C that is disposed so as to follow the second light diffraction element 1B. Each of these three light diffraction elements 1A, 1B, and 1C is one example of the light diffraction element 1 described above.

The first light diffraction element 1A includes a first position adjustment optical structure 1A2 as well as a first computing optical structure 1A1. The second light diffraction element 1B includes a second position adjustment optical structure 1B2 and a third position adjustment optical structure 1B3 as well as a second computing optical structure 1B1. The third light diffraction element 1C includes a fourth position adjustment optical structure 1C2 as well as a third computing optical structure 1C1. The three light diffraction elements 1A, 1B, and 1C are disposed such that (i) the three computing optical structures 1A1, 1B1, and 1C1 are aligned on a first straight line L1, (ii) the first position adjustment optical structure 1A2 and the second position adjustment optical structure 1B2 are aligned on a second straight line L2, and (iii) the third position adjustment optical structure 1B3 and the fourth position adjustment optical structure 1C2 are aligned on a third straight line L3.

When adjustment light having a specific intensity distribution is inputted to the first position adjustment optical structure 1A2, the first position adjustment optical structure 1A2 is used to form an optical image having a specific intensity distribution on the second position adjustment optical structure 1B2. The second position adjustment optical structure 1B2 is used to change, in accordance with a position of the second light diffraction element 1B with respect to the first light diffraction element 1A, the intensity distribution of the optical image that has been formed by the first position adjustment optical structure 1A2. The position of the second light diffraction element 1B with respect to the first light diffraction element 1A can be set appropriate by adjusting the position of the second light diffraction element 1B with respect to the first light diffraction element 1A so that the optical image detected with use of an image sensor that is disposed so as to follow the second position adjustment optical structure 1B2 has an intensity distribution that is identical to a predetermined intensity distribution.

In one or more embodiments, the first position adjustment optical structure 1A2 serves as a condenser lens for concentrating the adjustment light on a center portion of the second position adjustment optical structure 1B2. In addition, in one or more embodiments, the second position adjustment optical structure 1B2 serves as a mask that transmits the adjustment light incident on the center portion of the second position adjustment optical structure 1B2 and that blocks (absorbs or reflects) the adjustment light incident on a peripheral portion of the second position adjustment optical structure 1B2. Thus, a shift of the position of the second light diffraction element 1B from an appropriate position decreases an intensity of the adjustment light passing through the second position adjustment optical structure 1B2. Further, diffraction light is generated in a direction in which the position of the second light diffraction element 1B shifts from the appropriate position. Therefore, monitoring the intensity distribution of the adjustment light passing through the second position adjustment optical structure 1B2 makes it possible to specify in which direction and to what degree the second light diffraction element 1B is shifted.

When position adjustment light having a certain intensity distribution is inputted to the third position adjustment optical structure 1B3, the third position adjustment optical structure 1B3 is used to form an optical image having a specific intensity distribution on the fourth position adjustment optical structure 1C2. The fourth position adjustment optical structure 1C2 is used to change, in accordance with a position of the third light diffraction element 1C with respect to the second light diffraction element 1B, the intensity distribution of the optical image that has been formed by the third position adjustment optical structure 1B3. The position of the third light diffraction element 1C with respect to the second light diffraction element 1B can be set appropriate by adjusting the position of the third light diffraction element 1C with respect to the second light diffraction element 1B so that the optical image detected with use of an image sensor that is disposed so as to follow the fourth position adjustment optical structure 1C2 has an intensity distribution that is identical to a predetermined intensity distribution.

In one or more embodiments, the third position adjustment optical structure 1B3 serves as a condenser lens for concentrating the adjustment light on a center portion of the fourth position adjustment optical structure 1C2. In addition, in one or more embodiments, the fourth position adjustment optical structure 1C2 serves as a mask that transmits the adjustment light incident on the center portion of the fourth position adjustment optical structure 1C2 and that blocks (absorbs or reflects) the adjustment light incident on a peripheral portion of the fourth position adjustment optical structure 1C2. Thus, a shift of the position of the third light diffraction element 1C from an appropriate position decreases the intensity of the adjustment light passing through the fourth position adjustment optical structure 1C2. Further, diffraction light is generated in a direction in which the position of the third light diffraction element 1C shifts from the appropriate position. Therefore, monitoring the intensity distribution of the adjustment light passing through the fourth position adjustment optical structure 1C2 makes it possible to specify in which direction and to what degree the third light diffraction element 1C is shifted.

Note that the first light diffraction element 1A may be further provided with a position adjustment optical structure that is equivalent to the first position adjustment optical structure 1A2, and the second light diffraction element 1B may be further provided with a position adjustment optical structure that is equivalent to the second position adjustment optical structure 1B2. This makes it possible to adjust not only a translational shift in position of the second light diffraction element 1B with respect to the first light diffraction element 1A but also a rotational shift in angle of the second light diffraction element 1B with respect to the first light diffraction element 1A.

Similarly, the second light diffraction element 1B may be further provided with a position adjustment optical structure that is equivalent to the third position adjustment optical structure 1B3, and the third light diffraction element 1C may be further provided with a position adjustment optical structure that is equivalent to the fourth position adjustment optical structure 1C2. This makes it possible to adjust not only a translational shift in position of the third light diffraction element 1C with respect to the second light diffraction element 1B but also a rotational shift in angle of the third light diffraction element 1C with respect to the second light diffraction element 1B.

The above-described method for adjusting the positions of the light diffraction elements 1A, 1B, and 1C may be performed by a manufacturer before the optical computing device 2 is shipped as a product, or may be performed by a user after the optical computing device 2 has been shipped as a product. That is, the above-described method for adjusting the positions of the light diffraction elements 1A, 1B, and 1C can be performed as a simple method or can be performed as part of a method for manufacturing the optical computing device 2.

One or more embodiments can also be expressed as follows:

A light diffraction element according to Aspect 1 of one or more embodiments employs a configuration such that the light diffraction element includes: a computing optical structure constituted by a plurality of microcells; and a position adjustment optical structure formed outside the computing optical structure.

According to the above configuration, it is possible to achieve a light diffraction element which allows for accurate adjustment of a position of the light diffraction element with respect to another light diffraction element that is disposed so as to precede or follow the light diffraction element.

A light diffraction element according to Aspect 2 of one or more embodiments employs, in addition to the configuration of the light diffraction element according to Aspect 1, a configuration such that the light diffraction element includes, as the position adjustment optical structure, one or both of: an optical structure configured to form an optical image having a specific intensity distribution; and an optical structure configured to change an intensity distribution of an optical image.

According to the above configuration, in a case where the light diffraction element includes, as a position adjustment optical structure, an optical structure configured to form an optical image having a specific intensity distribution, it is possible to achieve a light diffraction element which allows for accurate adjustment of a position of the light diffraction element with respect to another light diffraction element that is disposed so as to follow the light diffraction element. In addition, according to the above configuration, in a case where the light diffraction element includes, as the position adjustment optical structure, an optical structure configured to change an intensity distribution of an optical image, it is possible to achieve a light diffraction element which allows for accurate adjustment of a position of the light diffraction element with respect to another light diffraction element that is disposed so as to precede the light diffraction element.

A light diffraction element according to Aspect 3 of one or more embodiments employs, in addition to the configuration of the light diffraction element according to Aspect 1 or 2, a configuration such that a distance between the computing optical structure and the position adjustment optical structure is larger than a maximum value of a distance between two microcells selected from the plurality of microcells.

According to the above configuration, it is possible to reduce, to a negligible level, influence of the position adjustment optical structure on signal light inputted to the computing optical structure or on signal light outputted from the computing optical structure. Therefore, according to the above configuration, it is possible to achieve, without influence on optical computing, a light diffraction element which allows for accurate adjustment of a position of the light diffraction element with respect to another light diffraction element that is disposed so as to precede or follow the light diffraction element.

An optical computing device according to Aspect 4 of one or more embodiments employs a configuration such that the light diffraction element includes at least: a first light diffraction element which is the light diffraction element according to any one of Aspects 1 to 3 and in which a first position adjustment optical structure is formed; and a second light diffraction element which is the light diffraction element according to any one of Aspects 1 to 3 and in which a second position adjustment optical structure is formed, the first position adjustment optical structure being configured to form, on the second position adjustment optical structure, an optical image having a specific intensity distribution, and the second position adjustment optical structure being configured to change, in accordance with a position of the second light diffraction element with respect to the first light diffraction element, the intensity distribution of the optical image that has been formed by the first position adjustment optical structure.

According to the above configuration, it is possible to achieve an optical computing device which allows for accurate adjustment of a position of a second light diffraction element with respect to a first light diffraction element.

An optical computing device according to Aspect 5 of one or more embodiments employs, in addition to the configuration of the optical computing device according to Aspect 4, a configuration such that the optical computing device further includes a third light diffraction element which is the light diffraction element according to any one of Aspects 1 to 3 and in which a fourth position adjustment optical structure is formed, the second light diffraction element further including a third position adjustment optical structure formed therein, the third position adjustment optical structure being configured to form, on the fourth position adjustment optical structure, an optical image having a specific intensity distribution, and the fourth position adjustment optical structure being configured to change, in accordance with a position of the third light diffraction element with respect to the second light diffraction element, the intensity distribution of the optical image that has been formed by the third position adjustment optical structure.

According to the above configuration, it is possible to achieve an optical computing device which allows for accurate adjustment of a position of a third light diffraction element with respect to the second light diffraction element as well as accurate adjustment of the position of the second light diffraction element with respect to the first light diffraction element.

An optical computing device according to Aspect 6 of one or more embodiments employs, in addition to the configuration of the light diffraction element according to Aspect 5, a configuration such that the first light diffraction element, the second light diffraction element, and the third light diffraction element are disposed such that the first position adjustment optical structure and the second position adjustment optical structure are aligned on a first straight line, and the third position adjustment optical structure and the fourth position adjustment optical structure are aligned on a second straight line.

According to the above configuration, it is possible to achieve an optical computing device which allows for accurate adjustment of each of the position of the second light diffraction element with respect to the first light diffraction element and the position of the third light diffraction element with respect to the second light diffraction element.

A position adjusting method according to Aspect 7 of one or more embodiments is a method for adjusting a position of a light diffraction element of the optical computing device according to any one of Aspects 4 to 6, the method including the step of: adjusting a position of the second light diffraction element with respect to the first light diffraction element with reference to the intensity distribution of the optical image, the intensity distribution having been changed by the second position adjustment optical structure.

According to the above configuration, it is possible for a user of the optical computing device to easily achieve an optical computing device in which a position of a light diffraction element is accurately adjusted.

A manufacturing method according to Aspect 8 of one or more embodiments is a method for manufacturing the optical computing device according to any one of Aspects 4 to 6, the method including the step of: adjusting a position of the second light diffraction element with respect to the first light diffraction element with reference to the intensity distribution of the optical image, the intensity distribution having been changed by the second position adjustment optical structure.

According to the above configuration, it is possible for a manufacturer of the optical computing device to easily achieve an optical computing device in which a position of a light diffraction element is accurately adjusted.

Additional Remarks

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1 Light diffraction element
11 Computing optical structure
MC Microcell
12 Position adjustment optical structure
MC' Microcell
2 Optical computing device
1A First light diffraction element
1A1 First computing optical structure
1A2 First position adjustment optical structure
1B Second light diffraction element
1B1 Second computing optical structure
1B2 Second position adjustment optical structure
1B3 Third position adjustment optical structure
1C Third light diffraction element
1C1 Third computing optical structure
1C2 Fourth position adjustment optical structure

The invention claimed is:

1. A light diffraction element comprising:
a single substrate;
a computing optical structure constituted by microcells; and
a position adjustment optical structure disposed outside the computing optical structure, wherein
the computing optical structure and the position adjustment optical structure are disposed on the single substrate.

2. The light diffraction element according to claim 1, wherein the position adjustment optical structure comprises one or both of:
an optical structure that forms an optical image having an intensity distribution; and
an optical structure that changes an intensity distribution of an optical image.

3. The light diffraction element according to claim 1, wherein a distance between the computing optical structure and the position adjustment optical structure is larger than a maximum value of a distance between two microcells of the microcells.

4. An optical computing device comprising:
a first light diffraction element comprising:
a first computing optical structure constituted by micro-cells; and
a first position adjustment optical structure disposed outside the first computing optical structure; and
a second light diffraction element comprising:

a second computing optical structure constituted by microcells; and
a second position adjustment optical structure disposed outside the second computing optical structure, wherein
the first position adjustment optical structure forms, on the second position adjustment optical structure, an optical image having an intensity distribution, and
the second position adjustment optical structure changes, in accordance with a position of the second light diffraction element with respect to the first light diffraction element, the intensity distribution of the formed optical image.

5. The optical computing device according to claim 4, wherein
the second light diffraction element further comprises a third position adjustment optical structure,
the optical computing device further comprises:
a third light diffraction element comprising:
a third computing optical structure constituted by microcells; and
a fourth position adjustment optical structure disposed outside the third computing optical structure,
the third position adjustment optical structure forms, on the fourth position adjustment optical structure, an optical image having an intensity distribution, and
the fourth position adjustment optical structure changes, in accordance with a position of the third light diffraction element with respect to the second light diffraction element, the intensity distribution of the optical image that has been formed by the third position adjustment optical structure.

6. The optical computing device according to claim 5, wherein the first light diffraction element, the second light diffraction element, and the third light diffraction element are disposed such that the first position adjustment optical structure and the second position adjustment optical structure are aligned on a first straight line and the third position adjustment optical structure and the fourth position adjustment optical structure are aligned on a second straight line.

7. A method for adjusting a position of a light diffraction element of the optical computing device according to claim 4, comprising:
adjusting a position of the second light diffraction element with respect to the first light diffraction element based on the intensity distribution of the optical image, the intensity distribution having been changed by the second position adjustment optical structure.

8. A method for manufacturing the optical computing device according to claim 4, comprising:
adjusting a position of the second light diffraction element with respect to the first light diffraction element based on the intensity distribution of the optical image, the intensity distribution having been changed by the second position adjustment optical structure.

9. The light diffraction element according to claim 3, wherein
the microcells are disposed in a matrix manner,
the maximum value is a distance between a microcell disposed at a first corner of the computing optical structure and a microcell disposed at a second corner of the computing optical structure, and
the second corner is diagonally opposite to the first corner.

* * * * *